3,554,942
SEALANT OR SPACKLING COMPOSITION CONTAINING UNSATURATED CARBOXYLIC ACID COPOLYMER SALTS
Richard E. Zdanowski, 542 Dreshertown Road, Fort Washington, Pa. 19034, and Frank J. Glavis, 1187 Rydal Road, Rydal, Pa. 19046
No Drawing. Continuation of application Ser. No. 490,668, Sept. 27, 1965. This application June 10, 1969, Ser. No. 834,605
Int. Cl. C08f 37/16
U.S. Cl. 260—17          7 Claims

ABSTRACT OF THE DISCLOSURE

The present invention comprises a composition adapted to be used for spackling and sealing purposes consisting essentially of water, a filler, and an organic binder, said binder comprising 2.5 to 10 parts by weight, per 100 parts of the filler, of an alkali-metal salt of a copolymer, having a molecular weight of 10,000 to 600,000, of about 5 to 40% by weight of at least one $\alpha,\beta$-monoethylenically unsaturated acid and 25 to 60% by weight of at least one ester of acrylic acid with an alkanol having 1 to 8 carbon atoms, copolymer salt being water-soluble or being water-swellable and soluble in water upon the addition of more alkali, and 0.25 to 3 parts by weight, per 100 parts of the filler, of a water-soluble methyl cellulose ether, hydroxyethyl cellulose ether, or hydroxypropyl cellulose ether having a viscosity of 50 to 8,000 cps. determined at 25° C. on a 2% solution in water, the weight ratio of the copolymer salt to the cellulose ether being from 3:1 to 40:1, and the amount of water being such as to provide trowelling consistency.

---

This application is a continuation-in-part of Ser. No. 490,668, filed Sept. 27, 1965, and now abandoned.

The present invention is concerned with novel and improved sealing compositions, particularly adapted to seal the joints of plasterboard, gypsum board, and like wallboards including those faced with paper coverings, and to hold in adherent relationship a covering strip of paper, cloth, especially scrim or cheesecloth. Such "dry-wall" construction serves to replace plastering of the inside walls of buildings. The sealing and covering of the joints serves to prepare the walls for painting and other decoration.

Heretofore, the aqueous compositions of this type employed a binder of casein and/or starch. These materials are a potential source of discoloration by putrefaction, especially in moist climates. Previous attempts to employ vinyl polymers have had one or more of various drawbacks which, combined with the relatively high expense of the polymers, served to limit their entry into this field. For example, in moist climates or in periods of high humidity even in moderately dry climates, some of these compositions tend to lose their adherent strength. Others tend to be readily penetrated by liquids, either aqueous or organic, so that they require relatively heavy or more numerous coats of paint. Others were difficult to handle or apply, in other words they had poor trowelling properties.

In accordance with the present invention there is provided an improved sealant composition which overcomes many of these disadvantages and yet provides a tough joint to which the covering tape adheres well and is sufficiently resilient to remain adhered to the wallboard edges joined in spite of repeated variations in temperature giving rise to expansion of the boards.

In general the composition contains, as essential components, the following.

| Ingredient: | Parts by weight |
|---|---|
| (1) Filler | 100 |
| (2) Acrylic copolymer | 2.5–10 |
| (3) Water-soluble cellulose ether | 0.25–3 |
| (4) Water to trowelling consistency. | |

The weight ratio of (2) to (3) should be between about 3:1 to 40:1 and preferably between 14:1 to 32:1. The amount of water may be in the range of 50 to 90 parts by weight.

The filler may be any of the usual fillers, or a mixture thereof, such as whiting, kaolin, calcium carbonate, aluminum silicate, ground limestone, hydrated gypsum, talc. Five to 15% of the filler may be constituted by mica, asbestos, glass, wool or mineral wool fibers, fibrous magnesium silicate, quartz flour, sawdust, ground nut shells, cotton, wood pulp, linen fibers, rag fibers, metal fibers or flaked metals. The filler may comprise an inorganic or an organic pigment or a dye if coloration is desired.

The acrylic copolymer, preferably prepared by emulsion copolymerization, has a molecular weight in the range of about 10,000 to 600,000 viscosity average and preferably in the range of 20,000 to 200,000. To attain the low molecular weight that is essential, a chain transfer agent may be used in the emulsion polymerization procedure. An essential component of the copolymer is a content therein of about 5 to 40% by weight of acid units, sufficient of such units being in alkali metal salt form to render the at least partially neutral copolymer water-soluble or water-swellable and soluble in water upon the addition of more alkali. The term "salt" of an acid copolymer as used herein and in the claims attached hereto refers to copolymers in which part or all of the acid units are neutralized. The acid units may be derived from any $\alpha,\beta$-monoethylenically unsaturated acid, acrylic, methacrylic, and itaconic acid being preferred. Another essential component of the copolymer is 25 to 60% by weight of an ester of acrylic acid with an alkanol having 1 to 8, and preferably 1 to 4 carbon atoms. The copolymer may contain up to 70% by weight of methyl methacrylate, acrylonitrile, styrene or vinyltoluene.

The copolymer may also contain higher alkyl methacrylates and acrylates in lesser proportions, e.g. up to 50% replacing either part of the soft acrylic acid esters first mentioned, if the replacement is soft (i.e., it produces a soft homopolymer) or part of the methyl methacrylate, acrylonitrile, styrene or vinyltoluene or of the acid, if the replacement is hard. The copolymer may also contain up to 20% by weight of hydrophilic monomers, other than the acid, provided the copolymer thereby obtained is water-insoluble in acid form, that is before neutralization. Examples include $\beta$-hydroxyethyl methacrylate, $\beta$-hydroxypropyl methacrylate, $\gamma$-hydroxypropyl methacrylate, acrylamide, and methacrylamide, N-methylolacrylamide, N-methylacrylamide, and dimethylaminoethyl acrylate.

The water-soluble cellulose ether may either be methyl cellulose, hydroxy propyl cellulose or hydroxyethyl cellulose. The extent of substitution should not exceed that which corresponds to a water-solubility of at least 2% in 100 cc. of water. The cellulose ether may be in the form of linters or powder as long as it has sufficient water-solubility as defined. The ether may have a viscosity of 50 to 8,000 cps. as measured on a 2% solution at 25° C. If the cellulose ether has a lesser solubility than 2% then it should have a viscosity of at least 50 cps. at saturation and at 25° C. Preferably, the cellulose ether should have a viscosity of at least 100 cps. measured at 2% concentration and 25° C., or at saturation and 25° C. if its solubility is between 2 and 5%.

As pointed out in the table above setting out the proportions of the essential components of the composition the weight ratio of the acrylic copolymer to the water-soluble cellulose ether should be about between 3:1 and 40:1. These ratios are essential since failure to provide sufficient cellulose ether relative to the acrylic copolymer gives rise to difficulty in application and particularly in trowelling. At the other extreme, if there is insufficient acrylic copolymer, the composition has insufficient internal cohesiveness and lacks adhesive strength for bonding to the wallboard and the like and to the covering tape.

The composition may contain small amounts of other water-soluble materials including those of thermosetting type. Examples of such materials include glue, urea-formaldehyde resins, melamine formaldehyde resins, and phenol-formaldehyde condensates, poly-epoxide resins of the water-soluble type, starch, and protein, such as casein. In addition, the composition may comprise wetting agents or dispersants.

The composition is useful as a joint sealant or as a spackling compound for filling holes and imperfections in the surface or body of various materials such as plaster, wood, cement, and wallboards of all types including those of plastic composition. The compositions dry in air at room temperature. This drying action is quite rapid but not so fast as to interfere with proper application of the composition.

The compositions of the present invention exhibit excellent adhesion both to the wallboards and to the covering tape when employed as a joint sealant in the so called "dry-wall" construction. It is characterized by slow penetration of liquids including water and paints. Hence it does not require an excessive amount of paint to cover and conceal the composition beneath. When made up with water to proper consistency, it has lubricity which provides excellent trowelling properties and the ability to be formed into a neat feathered edge where it must be tapered off along the edge of the joint or other part of the substrate to which it is applied.

To assist those skilled in the art to practice the present invention, the following modes of operation are suggested by way of illustration, parts and percentages being by weight and the temperatures in degrees C. unless otherwise specifically noted.

(1a) The copolymer of a mixture of ethyl acrylate— 25 parts by weight, methyl methacrylate—70 parts by weight, and itaconic acid—5 parts by weight is prepared by conventional emulsion polymerization procedure at a viscosity molecular weight of approximately 200,000 using $CBrCl_3$ as a chain-transfer agent and then spray-dried to form a free-flowing white powder. The powder is then blended with micropulverized sodium hydroxide in a sufficient amount to react with and substantially neutralize at least about 85 to 90% of the methacrylic acid present in the composition. Ten parts of the copolymer/sodium hydroxide blend is then dry-mixed with 1 part by weight of β-hydroxypropyl cellulose (4,000 cps.—viscosity of 2% aqueous solution at 25° C.).

(b) 100 grams of calcium carbonate is blended with 7 grams of the composition obtained in (a) and then 50 grams of water is incorporated into the dry blend. The mix wets very quickly without any tendency to lump and when spread on a section of gypsum wallboard it trowels out very smoothly and with great ease. This system has excellent toughness after drying and it is characterized by excellent adhesion to the wallboard as well as to the paper joint tape which is placed over the trowelled-out layer of cement.

A control composition containing no acrylic copolymer is very watery when mixed with water and, after drying, it crumbles and has no significant adhesion to the gypsum wallboard or the commercial joint tape.

(2) The procedure of (1) above is repeated in runs *a* through *i* using the copolymers indicated in the following table instead of the copolymer used in (1). All of the copolymers have molecular weights of about 180,000 to 220,000 viscosity average.

| Run: | Copolymer composition (percent) |
|---|---|
| a | EA/MMA/IA—60/30/10. |
| b | EA/MMA/MAA—35/50/15. |
| c | EA/S/MAA—25/35/40. |
| d | EA/MMA/AA—35/50/15. |
| e | EA/MMA/AN/MAA—40/25/20/15. |
| f | MA/BA/MMA/MAA—20/15/50/15. |
| g | EA/MMA/HOPMA/MAA—35/40/10/15. |
| h | EA/MMA/HOMA/MAA—35/40/10/15. |
| i | MA/IA—60/40. |

Abbreviations used in above table:
 AN—acrylonitrile
 BA—butyl acrylate
 EA—ethyl acrylate
 HOMA—β-hydroxyethyl methacrylate
 HOPMA—β-hydroxypropyl methacrylate
 IA—itaconic acid
 MA—methyl acrylate
 MAA—methacrylic acid
 MMA—methyl methacrylate
 S—styrene In all cases results obtained are similar to those obtained in (1).

(3) Similar results are obtained when procedure (1) is repeated except that 15 grams of the acrylic copolymer of (2) run *b* is used with 1 gram of the cellulose ether and only 6 grams of the copolymer/cellulose ether combination is employed per 100 grams of calcium carbonate.

(4) Similar results are obtained when (3) above is repeated except that:

(a) For each 100 grams of calcium carbonate, 10 grams of the copolymer/cellulose ether mixture is used.

(b) For each 100 grams of calcium carbonate, 3 grams of the blend of copolymer and cellulose ether is used.

(5) Again, similar results are obtained when (3) is repeated except that 3 grams of the acrylic copolymer/sodium hydroxide blend is mixed with 1 gram of the cellulose ether, 6 grams of the copolymer/cellulose ether blend is incoporated into 100 grams of calcium carbonate and the mixture is then slurried with 50 grams of water before application as a sealant.

(6) Execellent results are also obtained when (3) is repeated buy hydroxypropyl cellulose of lower viscosity (400 cps.—2% solution at 25° C.) is used.

(7) Excellent results are also obtained when (3) is repeated but hydroxypropyl cellulose of lower viscosity (50 cps.—2% solution at 25° C.) is used.

(8) Good results are also obtained when procedure (1) is repeated with the copolymer of run *e* of (2) above, in place of calcium carbonate the following blend is employed: limestone—60 parts by weight, clay—10 parts by weight, calcium carbonate — 10 parts by weight, mica—10 parts by weight, asbestos—10 parts by weight, and the amount of water used to form the paste is 75 grams instead of 50 grams.

(9) Good results are also obtained when procedure (1) is repeated except that the hydroxypropyl cellulose is replaced by 1 part of methyl cellulose, a 2% aqueous solution of which at 25° C. has a viscosity of 60 cps.

(10) Similar results are obtained when procedure (1) is repeated except that the cellulose ether is replaced by 1 part of β-hydroxyethyl cellulose, a 2% aqueous solution of which at 25° C. has a viscosity of 7500 cps.

We claim:
1. A dry composition adapted to be used for spackling and sealing purposes consisting essentially of a filler, and an organic binder, said binder comprising 2.5 to 10 parts by weight, per 100 parts of the filler, of a water-insoluble copolymer, having a molecular weight of 10,000 to 600,000, said copolymer consisting essentially of about 5 to 40% by weight of at least one α,β-monoethylenically unsaturated carboxylic acid and 25 to 60% by weight of at least one ester of acrylic acid with an alkanol having

1 to 8 carbon atoms, any additional monomer being ethylenically unsaturated and being at least one of the group consisting of an acrylic hydrophilic monomer other than said acid, a hardening monomer, and a softening monomer, alkali in an amount sufficient to confer water solubility upon said copolymer and 0.25 to 3 parts by weight, per 100 parts of the filler, of a water-soluble methyl cellulose ether, hydroxyethyl cellulose ether, or hydroxypropyl cellulose ether having a viscosity of 50 to 8,000 cps. determined at 25° C. on a 2% solution in water, the weight ratio of the copolymer salt to the cellulose ether being from 3:1 to 40:1, and in which the filler consists of at least 85% by weight of one or more of whiting, kaolin, calcium carbonate, aluminum silicate, ground limestone, hydrated gypsum, and talc, said polymer being such that when the mixture is diluted with water, applied to a surface and dried, a tough coating is obtained.

2. A composition according to claim 1 in which the copolymer contains up to 70% by weight of at least one of the hardening monomers methyl methacrylate, acrylonitrile, styrene or vinyltoluene, and up to 20% of a hydrophilic acrylic monomer other than acid provided the copolymer is water-insoluble in acid form.

3. The compositiin of claim 1 in which said copolymer has a molecular weight of below about 200,000, said alkanol has 1 to 4 carbon atoms said $\alpha,\beta$-ethylenically unsaturated acid is at least one of acrylic acid, methacrylic acid, and itaconic acid, and in which said copolymer consists essentially of said acid and said ester, and, if present in said polymer, an acrylic hydrophilic monomer other than said acid and also if present, one or more of methyl methacrylate, a higher alkyl acrylate or methacrylate, acrylonitrile, styrene and vinyltoluene.

4. A composition according to claim 1 in which the copolymer contains up to 70% by weight of methyl methacrylate, acrylonitrile, styrene or vinyltoluene.

5. In a method of sealing a structural joint, the improvement of mixing the composition of claim 1 with water to form a paste, applying the paste to said joint and curing the composition.

6. The composition of claim 1 in which said copolymer has a molecular weight of below about 200,000, said alkanol has 1 to 4 carbon atoms, and said $\alpha,\beta$-ethylenically unsaturated acid is at least one of acrylic acid, methacrylic acid, and itaconic acid, and in which said copolymer consists essentially of said acid and said ester, and, if present in said polymer, an acrylic hydrophilic monomer other than said acid and also if present, one or more of methyl methacrylate, a higher alkyl acrylate or methacrylate, acrylonitrile, styrene, and vinyltoluene.

7. The composition of claim 1 in which s aid alkali is sodium hydroxide at least partially present as dry particles thereof.

References Cited

UNITED STATES PATENTS

| 2,962,465 | 11/1960 | Lindstrom et al. | 260—29.6 |
| 3,007,887 | 11/1961 | Essig | 260—29.6X |
| 2,753,318 | 7/1956 | Maeder | 260—29.6 |
| 2,767,153 | 10/1956 | Sutton | 260—29.6 |
| 2,962,465 | 11/1960 | Lindstrom et al. | 20—29.6 |
| 2,962,465 | 3/1961 | Young et al. | 260—29.6X |
| 3,196,122 | 7/1965 | Evans | 260—29.6 |
| 3,248,356 | 4/1966 | Snyder | 260—29.6 |
| 3,303,147 | 2/1967 | Elden | 260—8 |
| 3,382,119 | 5/1968 | Henkel | 260—17X |

WILLIAM H. SHORT, Primary Examiner

E. A. NIELSEN, Assistant Examiner

U.S. Cl. X.R.

260—29.6